United States Patent [19]

Rosansky

[11] Patent Number: 4,743,520
[45] Date of Patent: May 10, 1988

[54] SELF-LIMITING ELECTROCHEMICAL CELL

[75] Inventor: Martin G. Rosansky, Montvale, N.J.
[73] Assignee: Power Conversion, Inc., Elmwood Park, N.J.
[21] Appl. No.: 932,044
[22] Filed: Nov. 18, 1986
[51] Int. Cl.$^4$ .............................................. H01M 2/14
[52] U.S. Cl. ...................................... 429/94; 429/105; 429/145; 429/196; 429/249
[58] Field of Search ............... 429/104, 249, 194, 247, 429/196, 3, 101, 105, 94, 72, 144, 145

[56] References Cited

U.S. PATENT DOCUMENTS

| | | | |
|---|---|---|---|
| 2,880,260 | 3/1959 | Strauss | 429/249 |
| 3,762,959 | 10/1973 | McCoy | 429/3 |
| 3,811,943 | 5/1974 | Minck et al. | 429/104 |
| 4,024,323 | 5/1977 | Versteegh | 429/249 |
| 4,110,515 | 8/1978 | Gupta | 429/104 |
| 4,184,012 | 1/1980 | Barrella | 429/94 |
| 4,405,696 | 9/1983 | Fischer et al. | 429/104 |

Primary Examiner—Anthony Skapars
Attorney, Agent, or Firm—A. W. Breiner

[57] ABSTRACT

A self-limiting electrochemical cell such as a lithium-sulfur dioxide cell having a non-porous, non-ion-permeable separator between the anode and cathode so as to control the passage of electrolyte and ion-transfer between the working electrodes thereby controlling the current drain based on the controlled amount of electrolyte. The invention provides a convenient method of controlling the drain rates of an electrochemical cell and permits utilization of conventional cells such as the lithium-sulfur dioxide, lithium-thionyl chloride, or lithium-sulfuryl chloride cells in applications not previously possible.

13 Claims, 1 Drawing Sheet

U.S. Patent
May 10, 1988
4,743,520
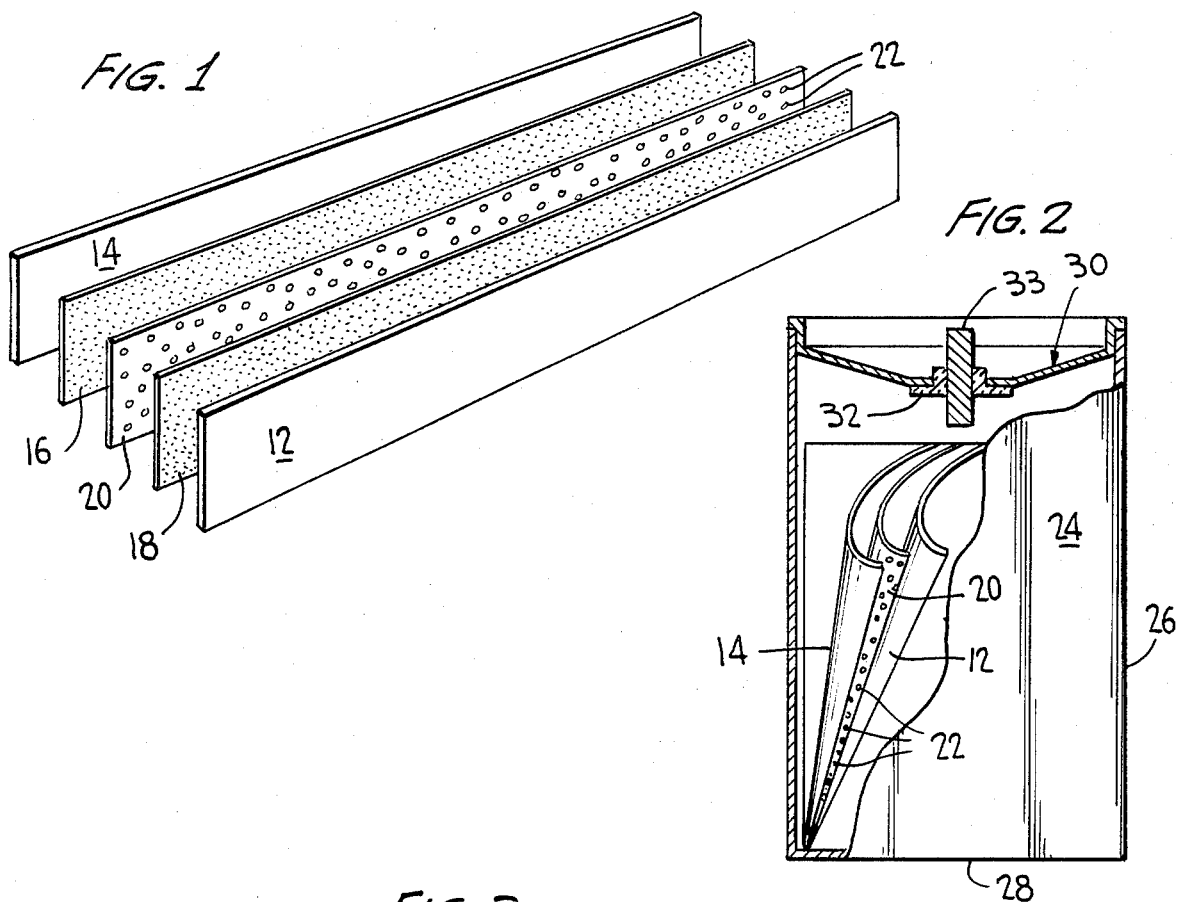
FIG. 1
FIG. 2
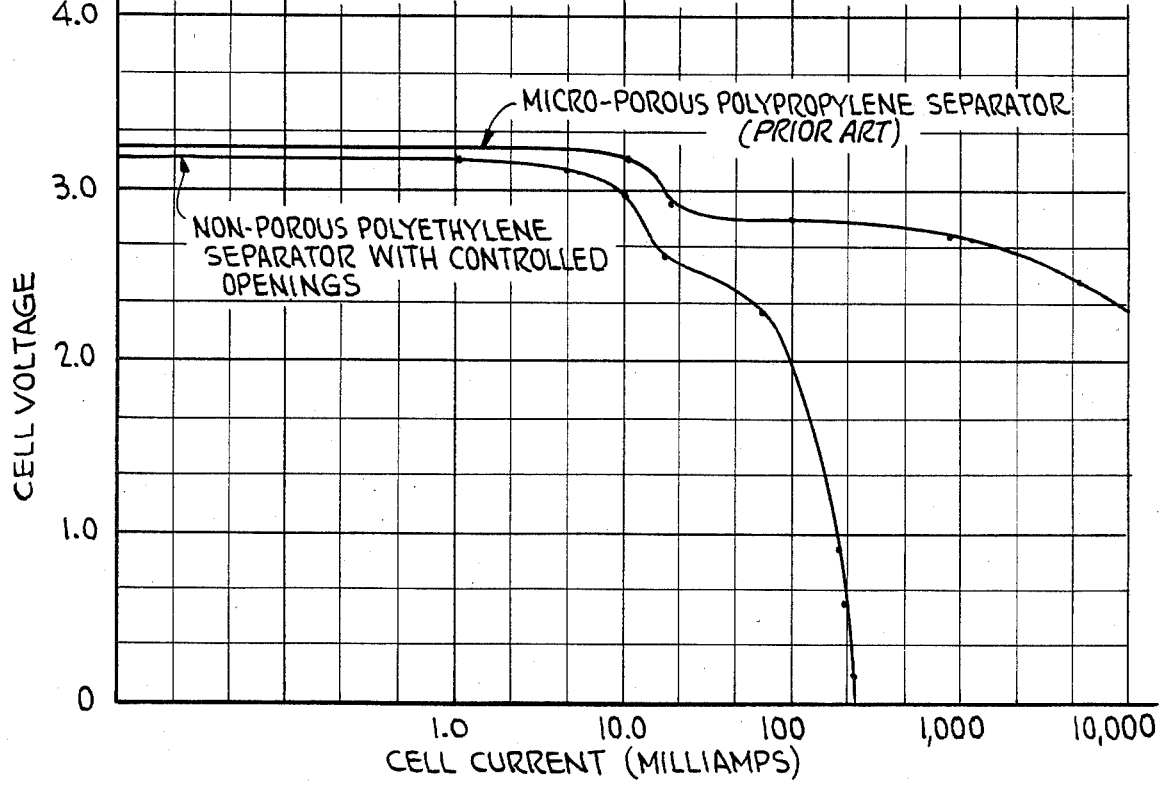
FIG. 3
POLARIZATION CURVE FOR TWO TYPES OF Li/SO₂ D-CELLS

SELF-LIMITING ELECTROCHEMICAL CELL

This invention relates to a self-limiting electrochemical cell. More particularly, this invention relates to a self-contained electrochemical cell, such as a lithium-sulfur dioxide, a lithium-thionyl chloride, or a lithium-sulfuryl chloride cell, which has a self-limiting current drain based on the controlled amount of electrolyte which is transferred between the working electrodes.

BACKGROUND AND PRIOR ART

In the construction of electrochemical cells for the direct generation of electrical energy, it is common to retain the electrolyte in a separator positioned between the working electrodes of the cell. In these cells a primary requirement of the separator has been to permit unrestricted—to the extent possible—electrolyte conduction or ion-transfer through the separator to provide free ion-transfer between the working electrodes. For example, U.S. Pat. Nos. 3,216,862 and 3,216,863 disclose a battery plate separator which is non-porous. However, the separator is readily ion-permeable. The primary object in using the non-porous separator, according to the patents, is to prevent metallic conduction between the plates of opposite polarity while freely permitting electrolytic conduction. The separator of these patents is essentially a three-part structure comprising two perforated sheets of an inert substance with a non-perforated ion-permeable membrane interposed between the sheets.

U.S. Pat. No. 3,223,556 discloses a fuel cell with separate anode and cathode compartments, with each contacting the surface of a porous material which is coated respectively by the anode and cathode catalyst layers. According to a teaching of the patent, the porous sheets of the anode and cathode have situated between them a gas-impermeable membrane which provides a gas-tight separation between the anode and cathode compartments. The gas-impervious sheet may contain a cationic exchange membrane. It is clear from the teaching of the patent that the gas-impervious sheet must be permeable to ion-transfer.

Numerous other patents are available in the prior art which teach the use of various types of separators between the electrodes in an electrochemical cell. None, however, has as a function the restriction of electrolyte passage or the restriction of ion-transfer through the membrane. To the contrary, the object is to permit free movement to the extent possible of ion species between the working electrodes of the cell. In the case of cells with soluble cathode depolarizers, such as $Li/SO_2$, $Li/SOCl_2$ and $Li/SO_2Cl_2$, it is necessary to transport not only ions but also the cathode depolarizer within the cell.

PRIMARY OBJECTS AND SUMMARY OF INVENTION

A primary object of the present invention is to provide an electrochemical cell that has the capability of being discharged at predetermined low or moderate rates and also pulsed at high rates, but one that will not sustain a continuous high current.

It is another primary object of the present invention to provide a relatively inexpensive construction for an electrochemical cell which can be discharged at predetermined low or moderate rates and pulsed at high rates so as to provide essentially a self-limiting characteristic to the cell.

According to the present invention, the electrochemical cell utilizes a barrier means between the working electrodes for controlling and limiting the amount of electrolyte which contacts the electrodes, and in this manner controls or limits the current drain of the cell. The cell in a preferred embodiment is of a spiral-wound construction having a microporous or non-woven separator disposed adjacent to each of the anode and cathode of the cell. The microporous separators serve as reservoirs for the electrolyte and eliminate electrode short-circuiting between the electrodes. Situated between the two microporous or non-woven separators is a non-porous, ion-impermeable separator having controlled openings or perforations therein. The number of openings or perforations in the non-porous separator determines the drain rate of the cell, and thus the number and size of perforations made in the non-porous separator depends upon the specific cell capabilities and/or needs.

The above-described self-limiting electrochemical cell has pulse capability. Due to the low drain rate, the self-limiting electrochemical cell will immediately polarize when subjected to an external short-circuit. This is particularly advantageous in a lithium-sulfur dioxide, lithium-thionyl chloride or lithium-sulfuryl chloride cell which, for safety, utilizes a safety vent. The immediate polarization will prevent the build-up of the amount of heat required to cause the safety vent to open. This invention will also be useful in cells of the type mentioned above to which a second depolarizer such as chlorine or bromine monochloride is added.

The self-limiting electrochemical cell, alternatively, can be comprised of an anode and cathode having disposed there between a non-porous separator with controlled openings or perforations for limiting electrolyte passage and thereby controlling and limiting the drain rate. Thus, the microporous separators adjacent each electrode are not utilized. As will be apparent from the following detailed description, various other modifications can be utilized.

Having described the invention in general terms, particularly preferred embodiments will be described with reference to the drawing.

THE DRAWING AND PREFERRED EMBODIMENTS

In the drawing,

FIG. 1 is a plan view of essential components of a preferred electrochemical cell according to this invention;

FIG. 2 is a view partly in section and partly exploded of a lithium-sulfur dioxide cell having self-limiting current features according to another embodiment in accordance with this invention; and FIG. 3 is a graph showing the polarization curve for two lithium-sulfur dioxide cells as illustrated in FIG. 2, one utilizing the concepts of the present invention and the other of conventional design.

Referring first to FIG. 1, there is shown the essential components of an electrochemical cell, such as the components of a lithium-sulfur dioxide cell, made according to this invention. The components include an anode 12, a cathode 14, microporous separators 16 and 18 adjacent to each of the anode and cathode, and a non-porous, non-electrolyte permeable separator 20 having a controlled number of openings or holes 22 so as to control the volume of electrolyte passing between the anode and cathode.

More specifically, the dual non-woven or microporous separators 16 and 18 serve as wicking agents for the electrolyte and eliminates electrode short-circuiting between the electrodes. Barrier 20 consists of a perforated non-porous, non-electrolyte permeable material, with the number of perforations or percent open area being a function of the specific cell's design parameters. For example, if a cell is required that must operate continuously at 0.1 amps and be capable of supporting 25 amp pulse loads with the caveat that the cell have a short-circuit current (for safety purposes) of only 15 amps, the non-porous barrier may be provided with only 50% open area. Likewise, if a cell is required that must sustain a continuous discharge of only a few milliamps, be capable of high current pulses, but must have a fairly low sustained short-circuit current, barrier 20 may only have, for example, a 20% open area. It becomes clear, therefore, that for a given basic cell design a whole family of electrochemical cells can be generated with different operating characteristics by simply varying the percent open area of the non-porous barrier. As the percent open area of the barrier becomes zero, the resultant cell can only sustain very low discharge currents and will polarize immediately as the currents are increased. It has been found that the current can be most effectively limited and controlled by adjusting the open area to comprise from about 1% to 60% of the total surface area of the barrier.

In order to more fully demonstrate the concepts of this invention, a "D" size lithium-sulfur dioxide cell is fabricated using as its only electrode separation a 0.001 inch thick "non-porous" polyethylene film as illustrated in FIG. 2. A similar cell was made with a conventional microporous polypropylene film of 0.001 inch thickness as a control and a polarization (current-voltage) curve was run on both cells. As illustrated in FIG. 2, the lithium-sulfur dioxide cells which were tested comprise a lithium anode 12, a carbon cathode 14, and a separator 20 which, in accordance with this invention, is a non-porous and non-ion-permeable polyethylene membrane except for the controlled openings 22 contained therein. In the conventional comparative cell which was tested, the separator 20 is a conventional microporous polypropylene membrane. The anode 12, cathode 14, and separator 20 are rolled for assembly into a cell casing 24 having a safety vent 26. The gaseous sulfur dioxide electrolyte is injected into the cell casing after the components are in place. The cell casing 24 is at the negative potential of the cell and a cover 30 is inserted into the top of the cell which contains the positive terminal 33. The components are suitably sealed, for example with a glass-metal seal 32 so as to prevent escape of the sulfur dioxide gas, and suitably isolate the positive and negative cell terminals. The basic electrochemical reaction of the lithium-sulfur dioxide system is as follows:

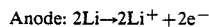

Anode: $2Li \rightarrow 2Li^+ + 2e^-$

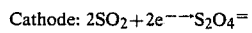

Cathode: $2SO_2 + 2e^- \rightarrow S_2O_4^=$

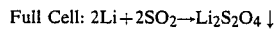

Full Cell: $2Li + 2SO_2 \rightarrow Li_2S_2O_4 \downarrow$

The results of the comparative test are shown in FIG. 3. The cell containing the non-porous polyethylene film will not sustain a current greater than 100 milliamps without polarizing severely. When cells of each type were discharged on 2700 ohm resistors which corresponds to a 1 milliamp discharge rate, both types of cells were operational after 600 hours. The voltages of the cells according to this invention were 2.84 volts while the controls were 2.90 volts. The voltage difference is due to the higher ohmic drop through the cell containing the "non-porous" separator. The non-porous polyethylene separator contained small pores made by needle punching to allow transfer of lithium ions from anode to cathode as is required by the reactions at the electrodes as above illustrated. The total open pore area for this cell was less than 5% of the total surface area.

When $Li/SO_2$ D cells of the types described above are subjected to an external short-circuit, the cells containing microporous polypropylene vented through a coined vent section 26 of the cell sidewall 24 while the cells containing non-porous polyethylene do not vent through the coined vent section 26. It will be apparent that the $SO_2$ couple can be replaced with thionyl chloride or sulfuryl chloride to provide lithium-thionyl chloride or lithium-sulfuryl chloride cells.

Many applications for lithium cells, such as random-access memories, require discharge rates in the range of from 1 microamp to about 1 milliamp. Lithium-sulfur dioxide cells in large sizes have been precluded from these uses since they are designed to vent when subjected to an external short-circuit and expel sulfur dioxide gas under these conditions. A further advantage of the self-limiting electrochemical cell of the present invention is that it allows the construction of a cell which is capable of low-rate drain only, and does not vent if subjected to an external short-circuit condition. This invention, therefore, provides a means of enhancing the safety of lithium-sulfur dioxide primary cells and, thus, allows their use in a variety of applications from which these devices were previously precluded.

The non-woven or microporous separators utilized according to the present invention can be any of the conventionally employed separators heretofore used in electrochemical cells such as the microporous polyethylene or polypropylene separators, impregnated paper, or the like. Further, the non-porous non-ion-permeable separator or barrier having the controlled porosity can be conveniently formed of a plastic material such as polyethylene or polypropylene, and various other materials which are non-porous and non-ion-permeable based on their method of separation. Further, the self-limiting concept of this invention may be applied to other types of primary cells through the use of separator materials of very low porosity which are compatible with the other cell components. The other types of cells include zinc-air, metal-hydrogen such as nickel-hydrogen, cadmium-nickel, as well as in fuel cells using oxygen-hydrogen or the like couples.

As will be apparent to one skilled in the art, various modifications can be made within the scope of the aforesaid description. Such modifications being within the ability of one skilled in the art form a part of the present invention and are embraced by the appended claims.

It is claimed:

1. An electrochemical cell comprising a housing, an anode, a cathode, an electrolyte between and in contact with each of said anode and cathode, a microporous separator containing electrolyte adjacent to each of said anode and cathode, and a stationary barrier positioned between said microporous separators, said barrier being non-electrolyte and non-ion-permeable and having preselected openings substantially uniformly distributed in from about 60% to 1% of the total surface area to permit electrolyte passage and ion-transfer throught said openings in said barrier in controlled amounts, thereby providing said cell with self-limiting current characteristics.

2. The elctrochemical cell of claim 1 wherein said microporous separators are composed of polypropylene.

3. The electrochemical cell of claim 2 wherein said barrier is composed of polyethylene.

4. A lithium-sulfur dioxide cell comprising a housing and within said housing a lithium anode, a cathode, an electrolyte between and in contact with each of said anode and cathode, each of said anode and cathode is adjacent and in contact with a microporous separator containing electrolyte, and a stationary barrier material positioned between said microporous separators, said barrier being non-electrolyte and non-ion-permeable and having preselected openings substantially uniformly distributed in form about 60% to 1% of the total surface area to permit electrolyte passage and ipn-transfer through said openings in said barrier in controlled amounts, thereby providing said cell with self-limiting current characteristics.

5. The lithium-sulfur dioxide cell of claim 4 wherein the cathode is a carbon cathode.

6. The lithium-sulfur dioxide cell of claim 5 wherein said microporous separators are composed of polypropyiene.

7. The lithium-sulfur dioxide cell of claim 6 wherein said barrier is composed of polyethylene.

8. The lithium-sulfur dioxide cell of claim 5 wherein said anode, cathode, separator, and barrier are in rolled configuration within said housing.

9. A lithium-oxyhalide cell which may optionally contain a second depolarizer comprising a housing and within said housing a lithium anode, a cathode, and electrolyte between and in contact with each of said anode and cathode, each of said anode and cathode is adjacent and in contact with a microporous separator containing electrolyte, and a stationary barrier material positioned between said microporous separators, said barrier being non-electrolyte and non-ion-permeable and having preselected openings substantially uniformly distributed in from about 60% to 1% of the total surface area to permit electrolyte passage and ion-transfer through said openings in said barrier in controlled amounts, thereby providing said cell with self-limiting current characteristics.

10. The lithium-oxyhalide cell of claim 9 wherein the cathode is a carbon cathode.

11. The lithium-oxyhalide cell of claim 9 wherein said microporous separators are composed of halocarbon polymers.

12. The lithium-sulfur dioxide cell of claim 9 wherein said barrier is composed of a halocarbon polymer.

13. The lithium-sulfur dioxide cell of claim 5 wherein said anode, cathode, separator, and barrier are in rolled configuration within said housing.

* * * * *